(12) United States Patent
Yeh et al.

(10) Patent No.: US 7,146,860 B2
(45) Date of Patent: Dec. 12, 2006

(54) METHOD FOR TEMPERATURE COMPENSATION OF A DIGITAL PRESSURE METER

(75) Inventors: Chih-Tai Yeh, Kaohsiung County (TW); Li-Jen Shih, Feng-Shan (TW)

(73) Assignee: Taiwan Silicon Microelectronics Corp., Kaohsiung (TW)

( * ) Notice: Subject to any disclaimer, the term of this patent is extended or adjusted under 35 U.S.C. 154(b) by 88 days.

(21) Appl. No.: 10/960,991

(22) Filed: Oct. 12, 2004

(65) Prior Publication Data
US 2006/0037403 A1 Feb. 23, 2006

(30) Foreign Application Priority Data
Aug. 17, 2004 (TW) .............................. 93124608 A

(51) Int. Cl.
*G01L 19/04* (2006.01)
(52) U.S. Cl. ........................................................ 73/708
(58) Field of Classification Search ................... 73/708, 73/721, 700; 361/106
See application file for complete search history.

(56) References Cited

U.S. PATENT DOCUMENTS 5,253,532 A * 10/1993 Kamens ......................... 73/708
6,111,739 A * 8/2000 Wu et al. ..................... 361/106

* cited by examiner

*Primary Examiner*—Jewel Thompson
(74) *Attorney, Agent, or Firm*—Rosenberg, Klein & Lee

(57) ABSTRACT

A digital pressure meter is equipped with an operational (OP) amplifier circuit, and a thermistor circuit is connected with the OP amplifier circuit for causing change of an amplification ratio of the OP amplifier circuit with such that a temperature compensation for output signals is effected; the thermistor circuit includes thermistors with positive temperature coefficient or ones with negative temperature coefficient; with the help of the thermistor circuit, the digital pressure meter can perform a measurement with an accuracy of ±1% FSO (full scale output) within the working temperature range.

12 Claims, 7 Drawing Sheets

(a)

(b)

(c)

(a)

(b)

(c)

(a)

(b)

(c)

(a)

(b)

(c)

US 7,146,860 B2

METHOD FOR TEMPERATURE COMPENSATION OF A DIGITAL PRESSURE METER

BACKGROUND OF THE INVENTION

1. Field of the Invention

The present invention relates to a method for temperature compensation of a digital pressure meter, more particularly one, according to which a low cost temperature compensation circuit is fitted to a low cost digital pressure meter such that the digital pressure meter can perform accurate pressure measurement under different surrounding temperatures.

2. Brief Description of the Prior Art

Referring to FIG. 1, a conventional digital pressure meter includes a power circuit 10, a pressure sensor 20, an operational amplifier (OP Amp) 30, an analog-to-digital converter 40, a microprocessor 50, a liquid crystal display (LCD) driver circuit 60, a LCD 601, and a buzzer 501.

The power circuit 10 supplies fixed voltage source or electric current source to the pressure sensor 20, which is used for measuring pressure, and which will produce analogue signals according to the measurement. The operational amplifier 30 is used for amplifying the analogue signals of the pressure sensor 20. The analog-to-digital converter 40 is used for converting the amplified analogue signals to digital ones, which will be processed by means of the microprocessor 50. Then, the measured value is displayed on the LCD 601. And, the buzzer 501 is used for alarming and reminding the user.

Referring to FIG. 2, a circuit diagram of the pressure sensor 20, the pressure sensor 20 includes four piezoresistors 202 to 205 connected together to form a Whetstone bridge 201. The resistance of the piezoresistors 202 and 204 will decrease as the measured value of pressure increases. And, the resistance of the piezoresistors 203 and 205 will increase as the measured value of pressure increases. When the power circuit gives voltage to the pressure sensor 20 through junctions 206 and 207 of Whetstone bridge 201, analogue signals will be produced according to voltage difference between junctions 208 and 209 as well as variation of the measured value of pressure.

Although electronic pressure meters are more accurate and stable than mechanical ones, piezoresistor type pressure sensors can be affected more easily to have large errors by temperature than mechanical ones. Therefore, many manufacturers of piezoresistor type pressure sensors, e.g. NovaSensor, and Sensortechnics, would often equip pressure sensors with temperature compensation circuits such that the values of pressure measured by the pressure sensors will be maintained correct even if temperature of the pressure sensors changes.

There are two major types of temperature compensation circuits. Referring to FIG. 3, a thermistor circuit 70 is arranged between the power circuit 10 and the pressure sensor 20. Because the resistance of the piezoresistors of the pressure sensor 20 will increase as temperature increases, the temperature coefficient of output span will decrease as temperature increases, and a thermistor of negative temperature coefficient (NTC) has to be used; thus, the resistance of the thermistor will decrease as temperature increases, allowing electric current passing through the pressure sensor 20 to increase to compensate for the temperature coefficient of output span. Consequently, the pressure sensor 20 will always provide correct measured values of pressure under different temperatures.

Referring to FIG. 4, a diode circuit 80 is arranged between the power circuit 10 and the pressure sensor 20. Because the resistance of the piezoresistors of the pressure sensor 20 will increase as temperature increases, the temperature coefficient of output span will decrease as temperature increases, and a diode of negative temperature coefficient (NTC) has to be used; thus, the forward voltage of the diode will reduce as temperature increases, allowing electric current passing through the pressure sensor 20 to increase to compensate for the temperature coefficient of output span. Consequently, the pressure sensor 20 will always provide correct measured values of pressure under different temperatures.

From the above description, it can be understood that conventionally, the voltage of power of a pressure sensor is applied to temperature compensation for the pressure sensor, by means of which compensation the temperature effect on span is reduced to the smallest extent possible. However, the above temperature compensation circuits will cause reduction to the voltage of power of pressure sensors, and in turns, voltage output and sensitivity of the pressure sensors will reduce. Consequently, amplifiers have to be used for effecting large amplification ratio of the voltage output, which will also amplify another parameter, Zero Pressure Offset, causing reduction to the correctness of the values of pressure measured by the pressure sensors. Therefore, in order to obtain more correct measured values of pressure, another compensation circuit has to be used for compensation for Temperature Effect On Offset once the above temperature compensations are used.

SUMMARY

It is a main object of the present invention to provide a method for temperature compensation of a digital pressure meter to overcome the above disadvantages.

According to the present method, fixed voltage source or fixed electric current is supplied to a pressure sensor of a digital pressure meter, and the digital pressure meter is equipped with an operational (OP) amplifier circuit, which has a thermistor circuit connected thereto and used for causing change of an amplification ratio of the OP amplifier circuit; thus, a temperature compensation is effected for temperature coefficient of output span and temperature coefficient of zero offset, and there isn't need for an additional compensation circuit for temperature effect on zero offset. With the help of the thermistor circuit, which is inexpensive, the digital pressure meter can perform an accurate measurement with an accuracy of ±1% FSO (full scale output) within the working temperature range. Therefore, the digital pressure meter has an up to standard accuracy, and it is economical to use.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
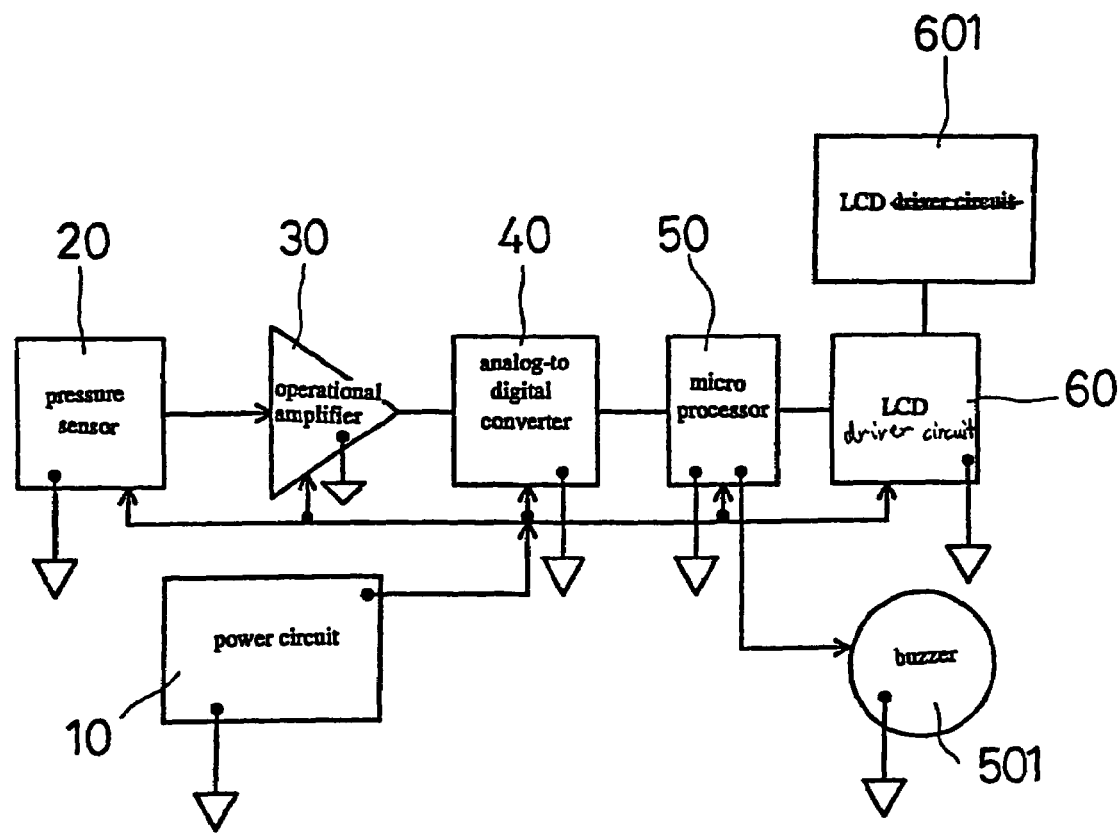
FIG. 1 is a block diagram of a conventional low cost pressure meter.
Figure 2:
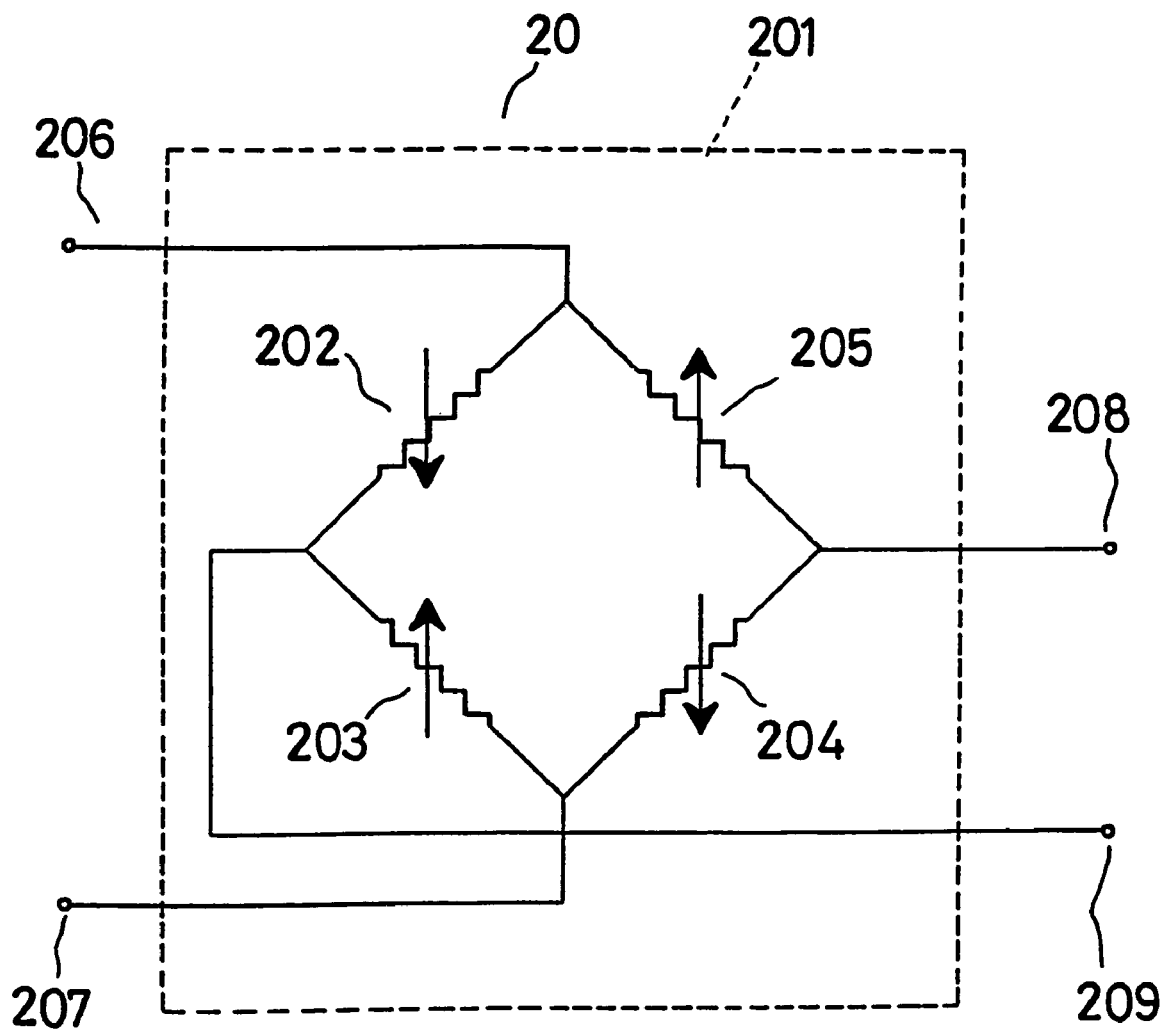
FIG. 2 is a circuit diagram of a conventional pressure sensor.
Figure 3:
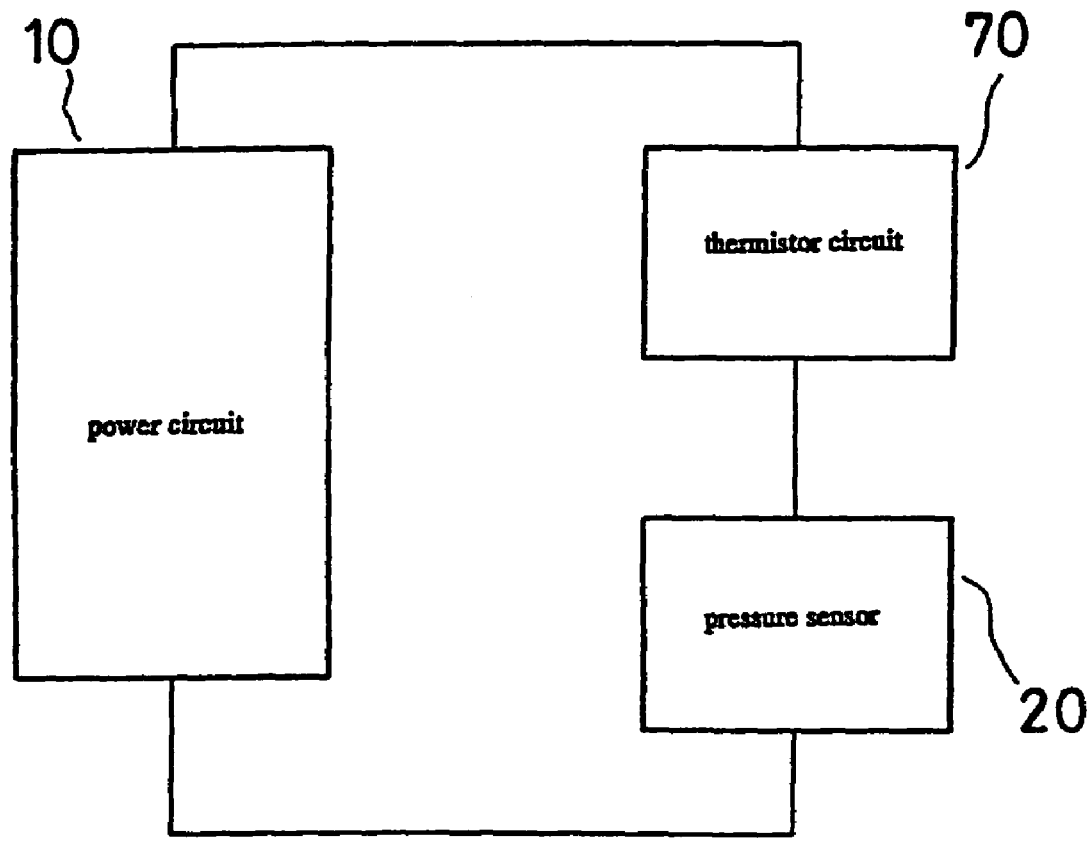
FIG. 3 is a block diagram of a conventional pressure sensor with a thermistor temperature compensation circuit.
Figure 4:
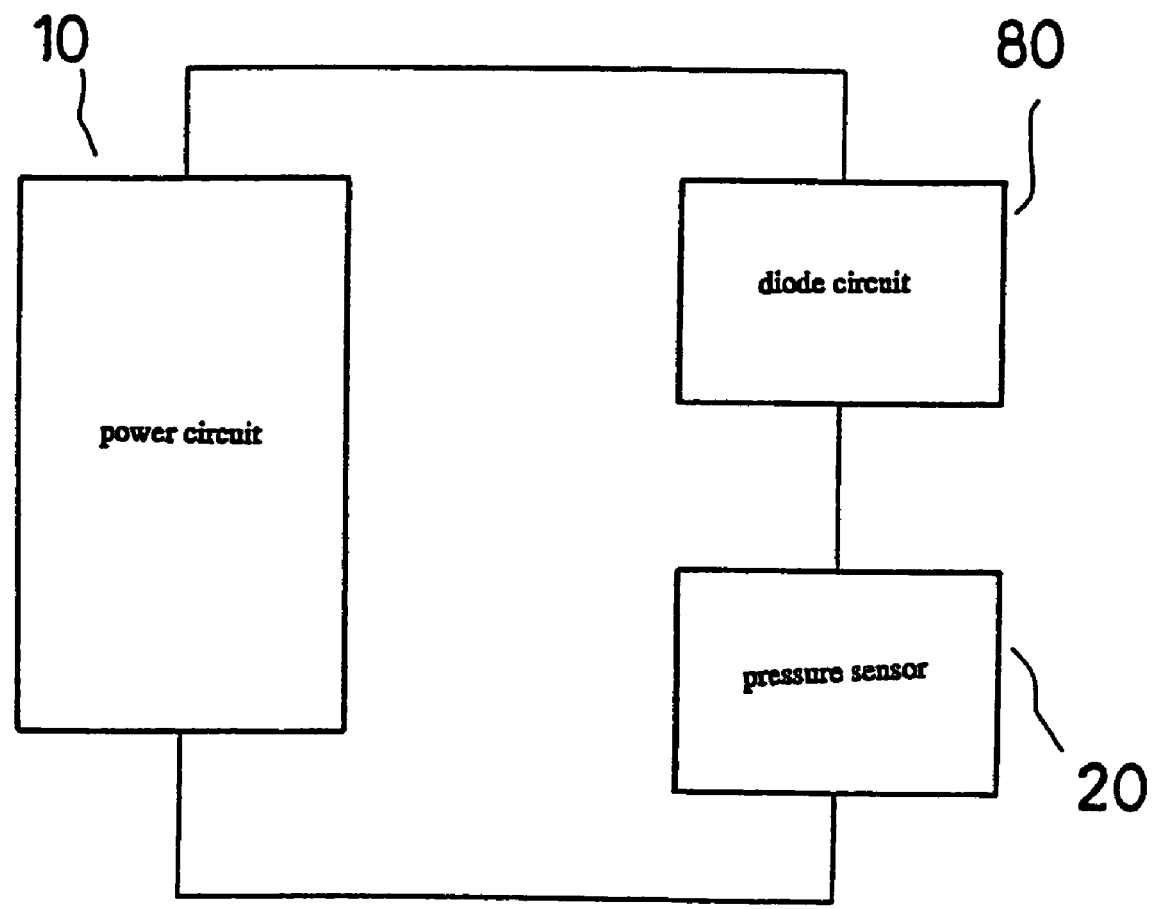
FIG. 4 is a block diagram of a conventional pressure sensor with a diode temperature compensation circuit.
Figure 5:
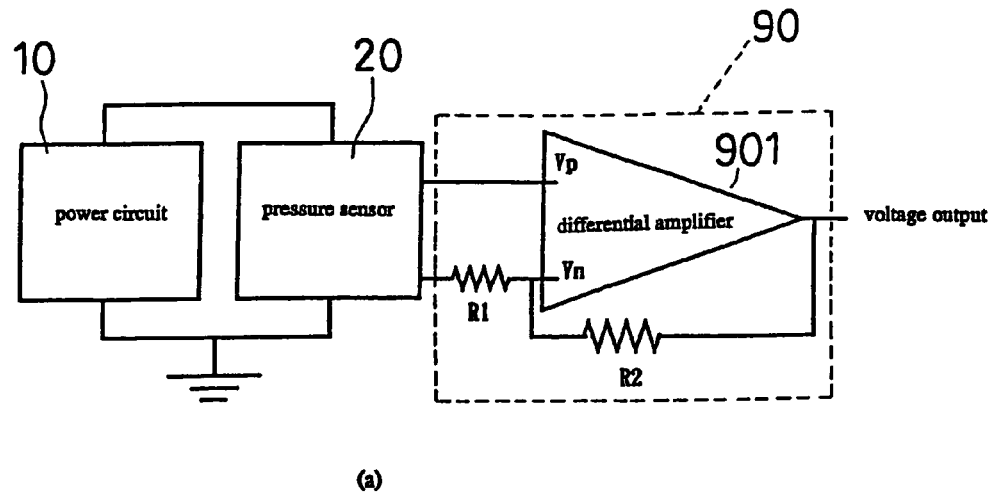
FIG. 5(a) is a circuit block diagram of a conventional pressure sensor with a non-inverting operational amplifier circuit.
FIG. 5(b) is a circuit block diagram of a conventional pressure sensor with an inverting operational amplifier circuit.
FIG. 5(c) is a circuit block diagram of a conventional pressure sensor with an instrumentation amplifier circuit.
Figure 5:
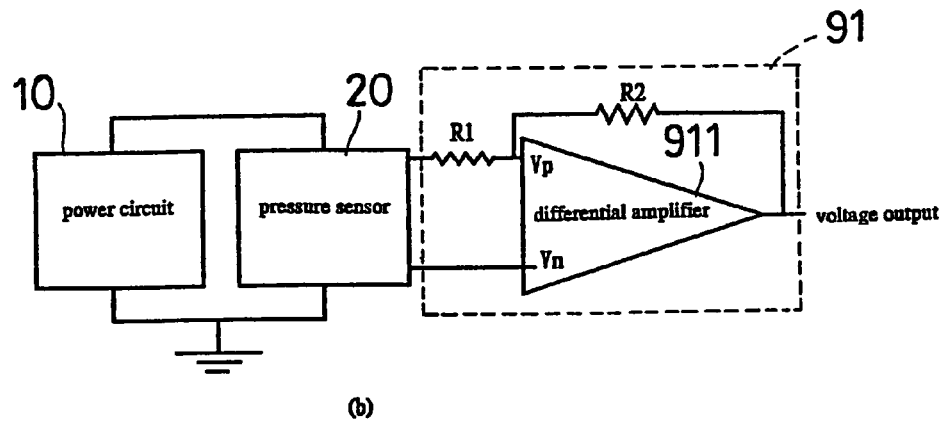
Figure 5:
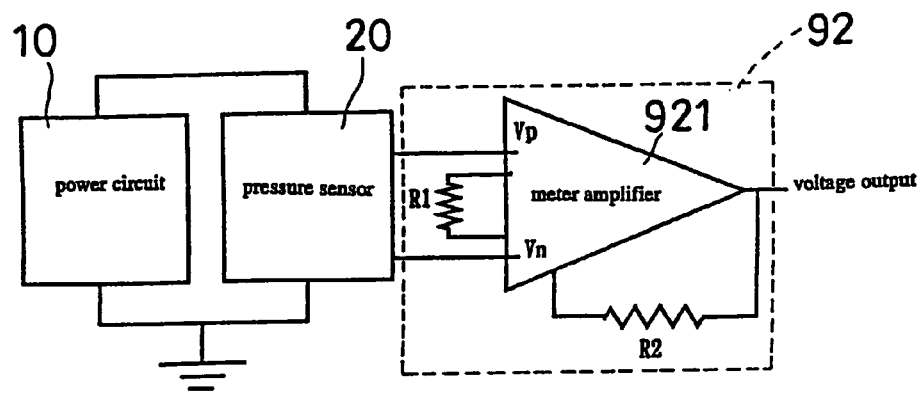

Referring to FIG. 5(a), pressure sensor 20 is connected with power circuit 10, and connected to input terminals of a non-inverting amplifier circuit 90, which includes resistors R1 and R2, and a differential amplifier 901 consisting of operational (OP) amplifiers. Referring to FIG. 5(b), pressure sensor 20 is connected with power circuit 10, and connected to input terminals of an inverting amplifier circuit 91, which includes resistors R1 and R2, and a differential amplifier 911 consisting of operational (OP) amplifiers. And, referring to FIG. 5(c), pressure sensor 20 is connected with power circuit 10, and connected to input terminals of an instrumentation amplifier circuit 92, which includes resistors R1 and R2, and a meter amplifier 921 consisting of operational (OP) amplifiers. Furthermore, the resistors R1 are in direct proportion to amplification ratio while the resistors R2 are in inverse proportion to amplification ratio.

Figure 6:
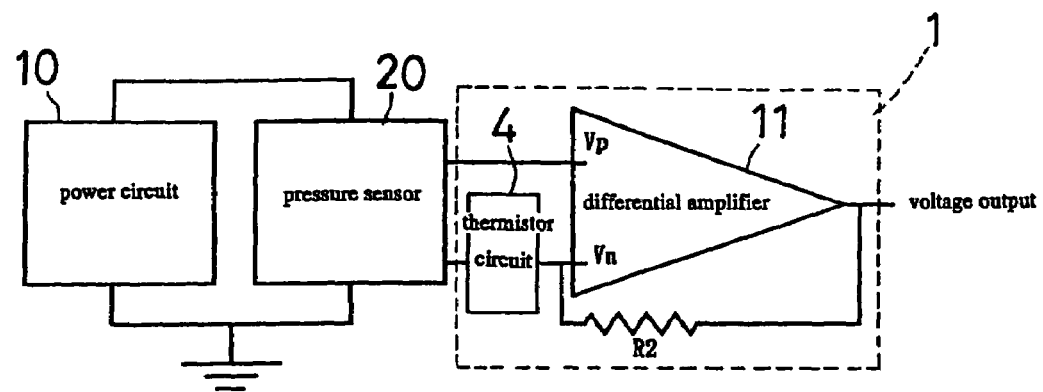
FIG. 6(a) is a circuit block diagram of a first embodiment of a pressure sensor with a non-inverting OP amplifier circuit including a thermistor circuit for temperature compensation.
FIG. 6(b) is a circuit block diagram of a second embodiment with an inverting OP amplifier circuit including a thermistor circuit.
FIG. 6(c) is a circuit block diagram of a third embodiment with an instrumentation amplifier circuit including a thermistor circuit.
Figure 6:
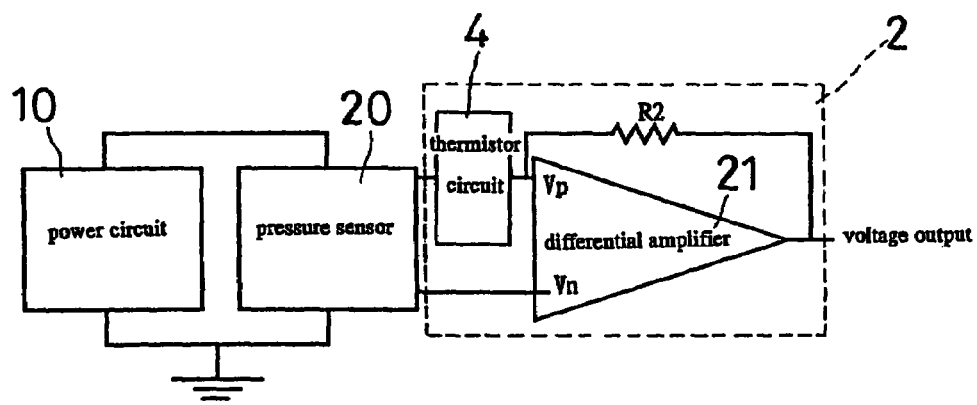
Figure 6:
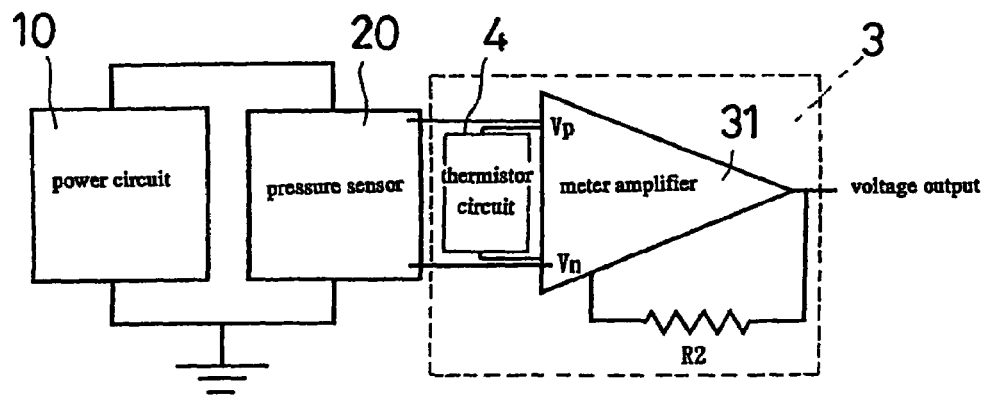

Improvements on the above amplifiers are made according to the method of the present invention, as shown in FIGS. 6(a) to 6(c), and 7(a) to 7(c). Referring to FIG. 6(a), in a first embodiment of the improvement, pressure sensor 20 is connected with power circuit 10, and connected to input terminals of a non-inverting amplifier circuit 1, which includes a thermistor circuit 4, a resistor R2, and a differential amplifier 11 consisting of operational (OP) amplifiers. Therefore, one can make the present non-inverting amplifier circuit 1 by means of simply replacing the resistor R1 of the circuit 90 shown in FIG. 5(a) with the thermistor circuit 4.

Referring to FIG. 6(b), in a second embodiment of the improvement, pressure sensor 20 is connected with power circuit 10, and connected to input terminals of an inverting amplifier circuit 2, which includes a thermistor circuit 4, a resistor R2, and a differential amplifier 21 consisting of operational (OP) amplifiers. Therefore, one can make the present inverting amplifier circuit 2 by means of simply replacing the resistor R1 of the circuit 91 shown in FIG. 5(b) with the thermistor circuit 4.

Referring to FIG. 6(c), in a third embodiment of the improvement, pressure sensor 20 is connected with power circuit 10, and connected to input terminals of an instrumentation amplifier circuit 3, which includes a thermistor circuit 4, a resistor R2, and an instrumentation amplifier 31 consisting of operational (OP) amplifiers. Therefore, one can make the present instrumentation amplifier circuit 3 by means of simply replacing the resistor R1 of the circuit 92 shown in FIG. 5(c) the thermistor circuit 4.

The above power circuits will supply fixed voltage or fixed electric current to the pressure sensors 20 and it will convert pressure sensed by them into output voltages. Because the non-inverting amplifier circuit 1, the inverting amplifier circuit 2, and the instrumentation amplifier circuit 3 are equipped with thermistor circuit 4, the amplification ratios thereof will change to cause temperature compensation for output signals when temperature of the pressure sensors 20 changes; resistance of thermistors of the thermistor circuits 4 will change when temperature of the pressure sensors 20 changes; if temperature coefficient of the pressure sensors 20 is negative, the thermistor circuits 4 have to be equipped with thermistors of negative temperature coefficient; if temperature coefficient of the pressure sensors 20 is positive, the thermistor circuits 4 have to be equipped with thermistors of positive temperature coefficient.

Because of the thermistor circuits 4 of the amplifier circuits 1, 2, and 3, there will be temperature compensation within the whole pressure range, and there will be temperature compensation for zero pressure offset as well. With the help of the thermistor circuits 4, which are inexpensive, the digital pressure meters can perform an accurate measurement with an accuracy of ±1% FSO (full scale output) within the working temperature range. Therefore, the digital pressure meters of the present invention have an up to standard accuracy, and they are economical to use.

Furthermore, the operational (OP) amplifier circuits can be single-ended, two-ended or multi-ended. And, the thermistor circuits 4 can be positioned on circuit boards of the digital pressure meters or in sensor housings such that the resistance of the thermistors thereof will change as temperature of the surroundings, i.e. the environment and the sensor housings, changes, and in turns, amplification ratio of the OP amplifier circuits changes.

Figure 7:
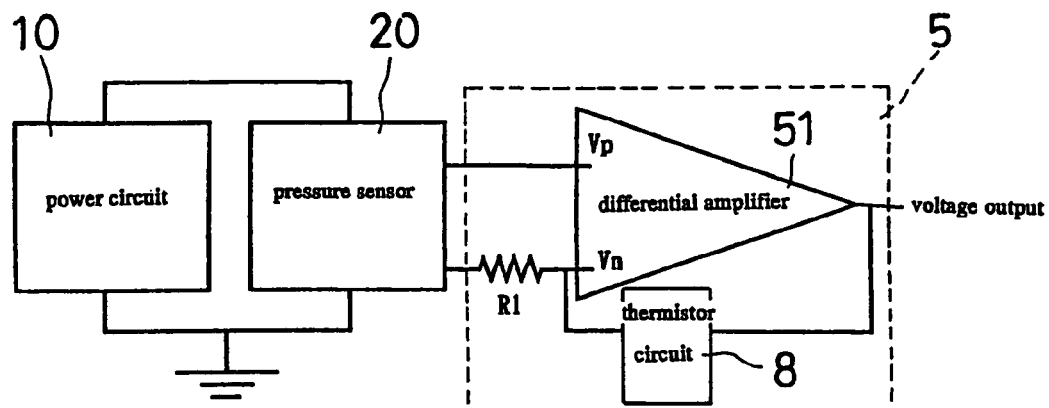
FIG. 7(a) is a circuit block diagram of a fourth embodiment of a pressure sensor with a non-inverting OP amplifier circuit including a thermistor circuit for temperature compensation.
FIG. 7(b) is a circuit block diagram of a fifth embodiment of a pressure sensor with an inverting OP amplifier circuit including a thermistor circuit.
FIG. 7(c) is a circuit block diagram of a sixth embodiment with an instrumentation amplifier circuit including a thermistor circuit.
Figure 7:
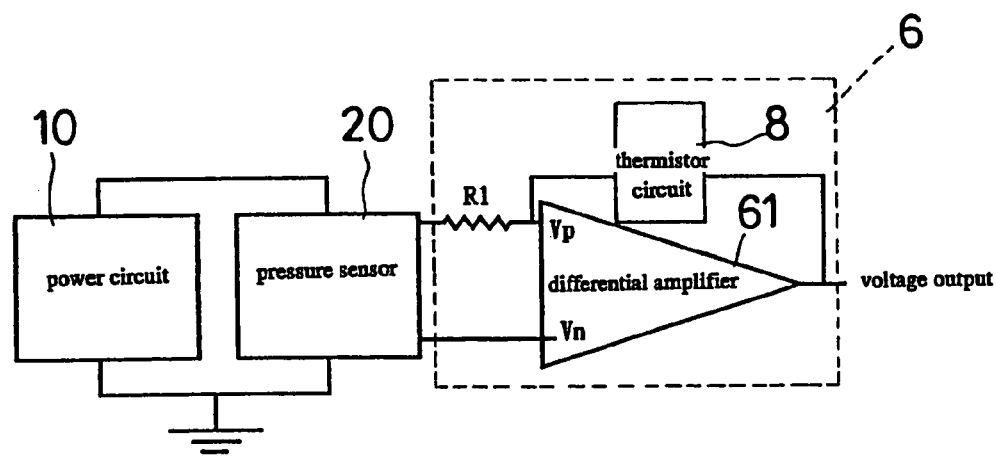
Figure 7:
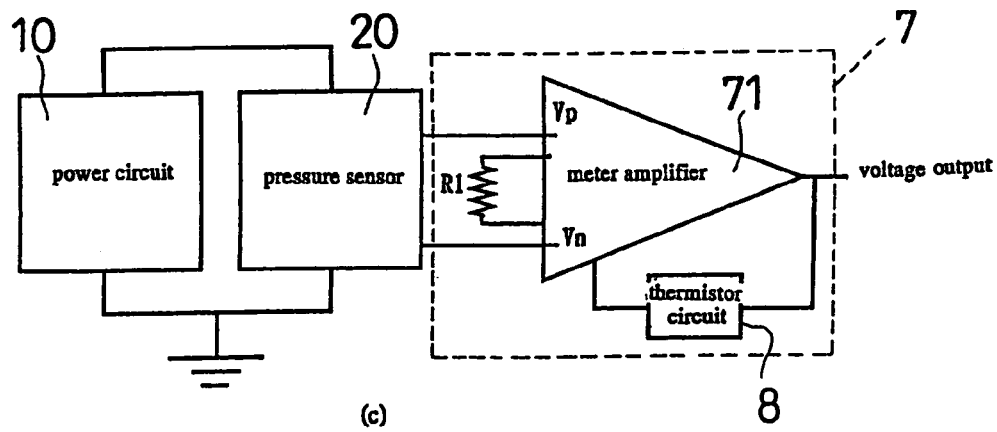

Referring to FIG. 7(a), in a fourth embodiment of the improvement, pressure sensor 20 is connected with power circuit 10, and connected to input terminals of a non-inverting amplifier circuit 5, which includes a thermistor circuit 8, a resistor R1, and a differential amplifier 51 consisting of operational (OP) amplifiers. Therefore, one can make the present non-inverting amplifier circuit 5 by means of simply replacing the resistor R2 of the circuit 90 shown in FIG. 5(a) with the thermistor circuit 8.

Referring to FIG. 7(b), in a fifth embodiment of the improvement, pressure sensor 20 is connected with power circuit 10, and connected to input terminals of an inverting amplifier circuit 6, which includes a thermistor circuit 8, a resistor R1, and a differential amplifier 61 consisting of operational (OP) amplifiers. Therefore, one can make the present inverting amplifier circuit 6 by means of simply replacing the resistor R2 of the circuit 91 shown in FIG. 5(b) with the thermistor circuit 8.

Referring to FIG. 7(c), in a sixth embodiment of the improvement, pressure sensor 20 is connected with power circuit 10, and connected to input terminals of an instrumentation amplifier circuit 7, which includes a thermistor circuit 8, a resistor R1, and an instrumentation amplifier 71 consisting of operational (OP) amplifiers. Therefore, one can make the present instrumentation amplifier circuit 7 by means of simply replacing the resistor R2 of the circuit 92 shown in FIG. 5(*c*) with the thermistor circuit 8.

The above power circuits 10 will supply fixed voltage or fixed electric current to the pressure sensors 20 and it will convert pressure sensed by them into output voltages. Because the non-inverting amplifier circuit 5, the inverting amplifier circuit 6, and the instrumentation amplifier circuit 7 are equipped with thermistor circuit 8, the amplification ratios thereof will change to cause temperature compensation for output signals when temperature of the pressure sensors 20 changes; resistance of thermistors of the thermistor circuits 8 will change when temperature of the pressure sensors 20 changes; if temperature coefficient of the pressure sensors 20 is negative, the thermistor circuits 4 have to be equipped with thermistors of positive temperature coefficient; if temperature coefficient of the pressure sensors 20 is positive, the thermistor circuits 4 have to be equipped with thermistors of negative temperature coefficient.

Because of the thermistor circuits 8 of the amplifier circuits 5, 6, and 7, there will be temperature compensation within the whole pressure range, and there will be temperature compensation for zero pressure offset as well. With the help of the thermistor circuits 8, which are inexpensive, the digital pressure meters can perform an accurate measurement with an accuracy of ±1% FSO (full scale output) within the working temperature range. Therefore, the digital pressure meters of the present invention have an up to standard accuracy, and they are economical to use.

Furthermore, the operational (OP) amplifier circuits can be single-ended, two-ended or multi-ended amplifier circuits. And, the thermistor circuits 8 can be positioned on circuit boards of the digital pressure meters or in sensor housings such that the resistance of the thermistors thereof will change as temperature of the surroundings, i.e. the environment and the sensor housings, changes, and in turns, amplification ratio of the OP amplifier circuits changes.

What is claimed is:

1. A method for temperature compensation of a digital pressure meter, according to which method a digital pressure meter is equipped with pressure sensor and an operational amplifier circuit coupled to receive an output thereof, and the operational amplifier circuit is connected with a thermistor circuit used for causing change of an amplification ratio as well as for effecting temperature compensation for output signals; the thermistor circuit including a plurality of thermistors whose resistance will change as surrounding temperature changes, thus causing amplification ratio of the operational amplifier circuit to change.

2. The method for temperature compensation of a digital pressure meter as claimed in claim 1, wherein the operational amplifier circuit is a non-inverting amplifier circuit.

3. The method for temperature compensation of a digital pressure meter as claimed in claim 1, wherein the operational amplifier circuit is an inverting amplifier circuit.

4. The method for temperature compensation of a digital pressure meter as claimed in claim 1, wherein the operational amplifier circuit is an instrumentation amplifier circuit.

5. The method for temperature compensation of a digital pressure meter as claimed in claim 1, wherein the operational amplifier circuit is a single-ended amplifier circuit.

6. The method for temperature compensation of a digital pressure meter as claimed in claim 1, wherein the operational amplifier circuit is a multi-ended amplifier circuit.

7. The method for temperature compensation of a digital pressure meter as claimed in claim 1, wherein the thermistor circuit has a negative temperature coefficient.

8. The method for temperature compensation of a digital pressure meter as claimed in claim 1, wherein the thermistor circuit has a positive temperature coefficient.

9. The method for temperature compensation of a digital pressure meter as claimed in claim 1, wherein the surrounding temperature is temperature of an environment.

10. The method for temperature compensation of a digital pressure meter as claimed in claim 1, wherein the surrounding temperature is temperature of an environment, and the thermistors of the thermistor circuit are positioned on a circuit board of the digital pressure meter to sense temperature of the environment for effecting temperature compensation for output signals.

11. The method for temperature compensation of a digital pressure meter as claimed in claim 1, wherein the thermistors of the thermistor circuit and the pressure sensor are positioned on a sensor housing for effecting temperature compensation for output signals.

12. The method for temperature compensation of a digital pressure meter as claimed in claim 1, wherein the surrounding temperature is temperature of a sensor housing.

* * * * *